United States Patent [19]

Hartmann et al.

[11] Patent Number: 5,584,374
[45] Date of Patent: Dec. 17, 1996

[54] METHOD AND APPARATUS FOR ROW-WISE SEPARATION OF RECTILINEAR, PLASTIC POROUS CONCRETE BODIES

[75] Inventors: Wilfried Hartmann, Emmering; Eberhard Brandt, Fürstenfeldbruck, both of Germany

[73] Assignee: Heber Aktiengesellschaft, Emmering, Germany

[21] Appl. No.: 371,290

[22] Filed: Jan. 11, 1995

[30] Foreign Application Priority Data

Feb. 3, 1994 [DE] Germany .................. 44 03 228.5

[51] Int. Cl.⁶ .................................................. B07C 5/07
[52] U.S. Cl. .................... 198/468.3; 414/798.9; 414/788; 83/151
[58] Field of Search .......... 83/102, 107, 109, 83/651.1, 56, 89, 90, 452, 91, 151, 13; 414/788, 798.9; 198/468.3, 434

[56] References Cited

U.S. PATENT DOCUMENTS

| | | | |
|---|---|---|---|
| Re. 31,060 | 10/1982 | Lutz ........................... | 414/788 |
| 1,055,490 | 3/1913 | Penfield ....................... | 414/788 |
| 3,088,186 | 5/1963 | Mennitt ....................... | 83/435.1 |
| 3,127,029 | 3/1964 | Luginbuhl ................... | 414/798.9 |
| 3,204,315 | 9/1965 | Akerfors ..................... | 83/651.1 |
| 3,538,562 | 11/1970 | Ekstedt et al. ............. | 83/651.1 |
| 3,727,496 | 4/1973 | Gorannson ................... | 83/56 |
| 3,895,551 | 7/1975 | Goransson ................... | 83/620 X |
| 3,919,372 | 11/1975 | Vogele ......................... | 83/36 X |
| 4,177,890 | 12/1979 | Steingrover ................. | 198/434 |
| 4,197,077 | 4/1980 | Kalvenes et al. ........... | 83/651.1 |
| 4,528,883 | 7/1985 | Goransson et al. ........ | 83/651.1 |
| 4,619,173 | 10/1986 | Goransson et al. ........ | 83/651.1 |
| 4,664,581 | 5/1987 | Matthews ..................... | 414/788 |
| 5,336,043 | 8/1994 | Bader .......................... | 414/798.9 |
| 5,443,357 | 8/1995 | Leeds .......................... | 198/434 |

FOREIGN PATENT DOCUMENTS

| | | |
|---|---|---|
| 0310640 | 1/1973 | Austria . |
| 0326549 | 2/1975 | Austria . |
| 0133239 | 7/1990 | European Pat. Off. . |
| 0958639 | 2/1957 | Germany . |
| 2502866 | 7/1976 | Germany . |
| 4135119 | 5/1993 | Germany . |

*Primary Examiner*—Rinaldi I. Rada
*Assistant Examiner*—Elizabeth Stanley
*Attorney, Agent, or Firm*—Flynn, Thiel, Boutell & Tanis, P.C.

[57] ABSTRACT

In this method for row-wise separation of rectilinear, plastic porous concrete bodies formed by longitudinal and transverse cutting of a rectilinear plastic porous concrete block preferably standing on edge. After turning back through 90°, the cut block is so placed with its major side surface on a plurality of parallel laminae for the separation and so that its longest side edge runs parallel to the direction of the laminae and that each row of porous concrete bodies is supported on at least one lamina. Before the separation, a clamping force is exerted from above on the upper ends of all the porous concrete bodies of the row to be separated. Independently thereof, a clamping force from above is exerted on the upper ends of all the porous concrete bodies of the stationary row in contact with the row to be separated. This clamping force is maintained during the separation and during the displacement of the lamina in the separating direction, a like directed displacing force is exerted synchronously on the upper ends of the porous concrete bodies carried by the separating lamina.

11 Claims, 6 Drawing Sheets

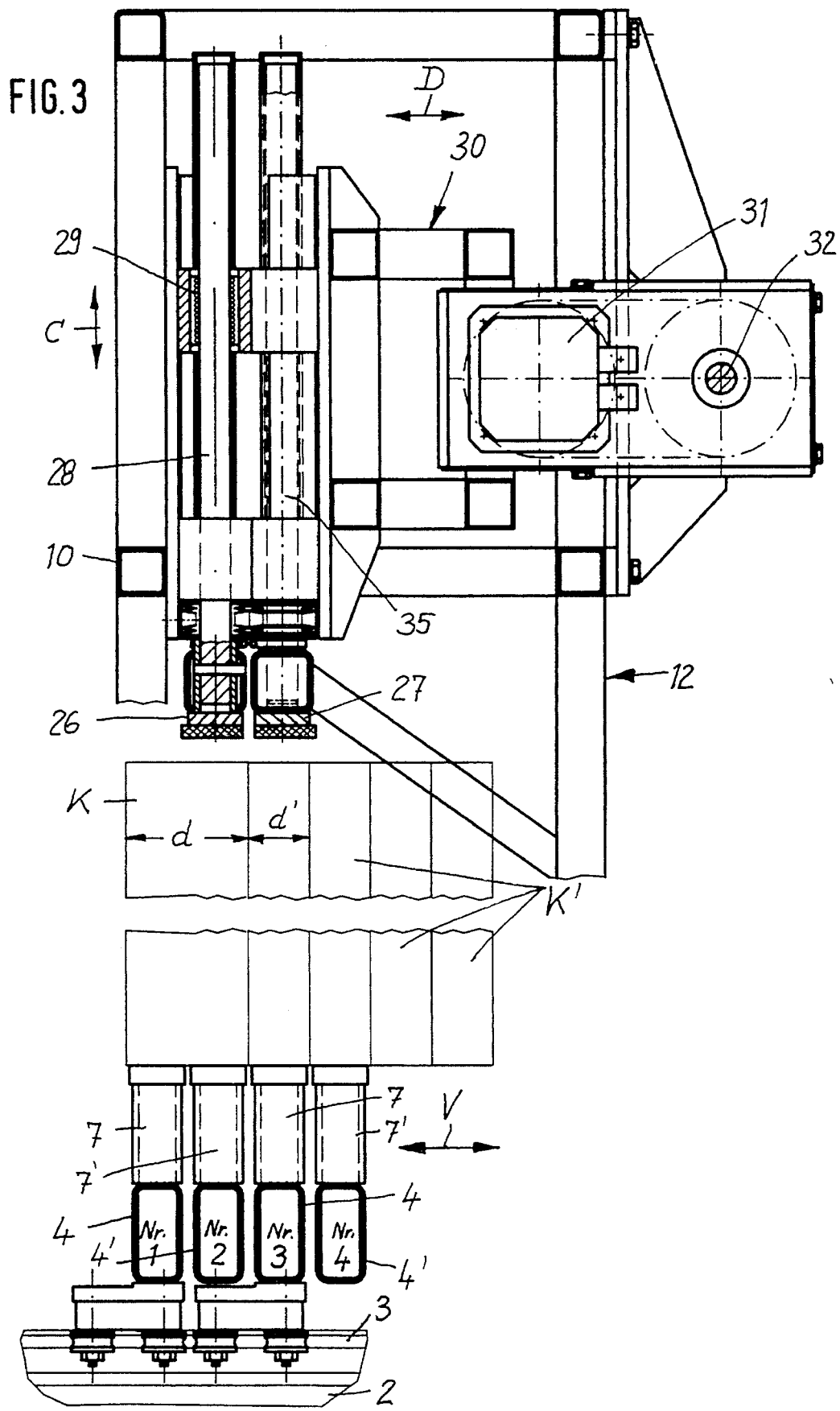

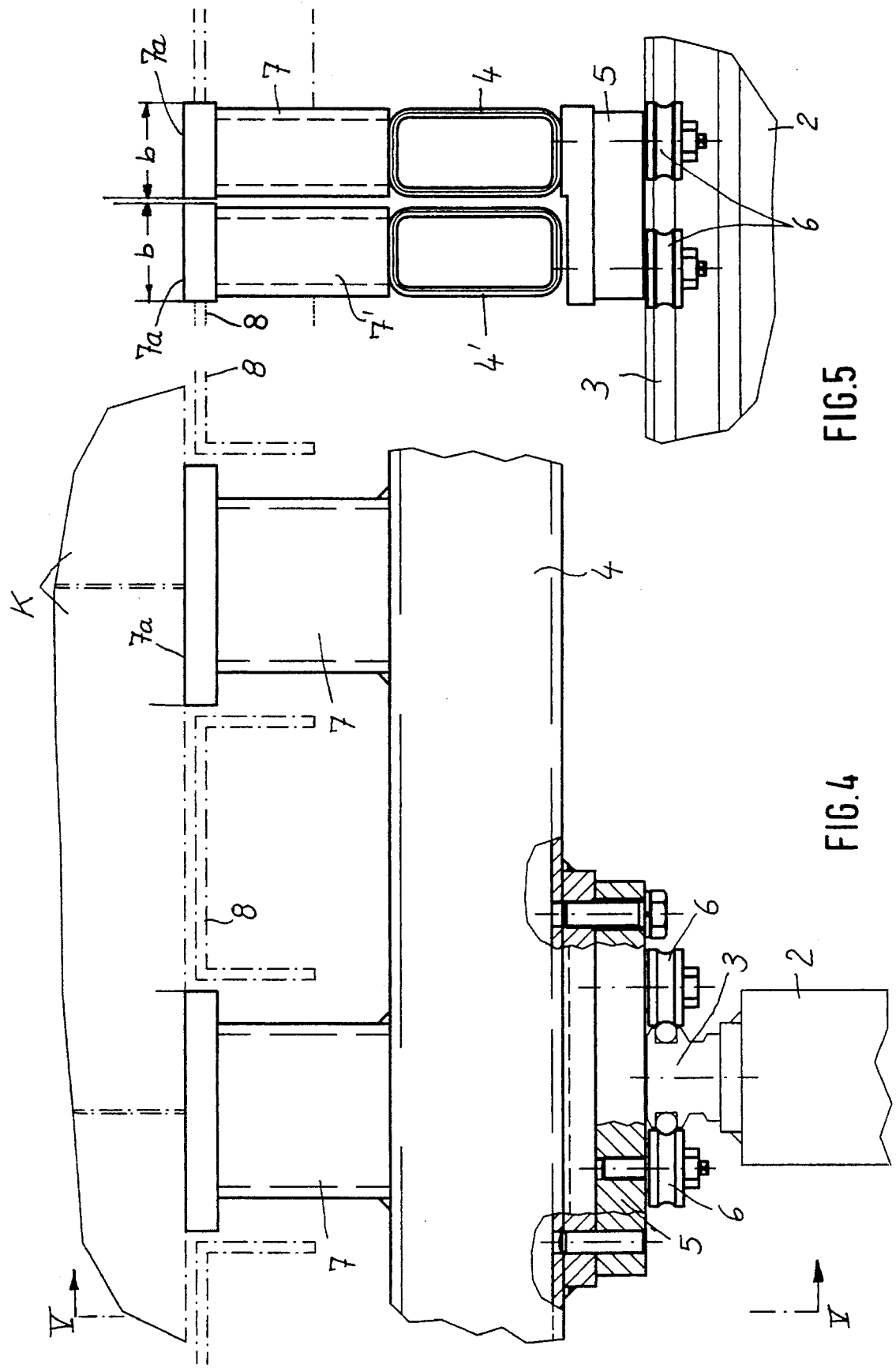

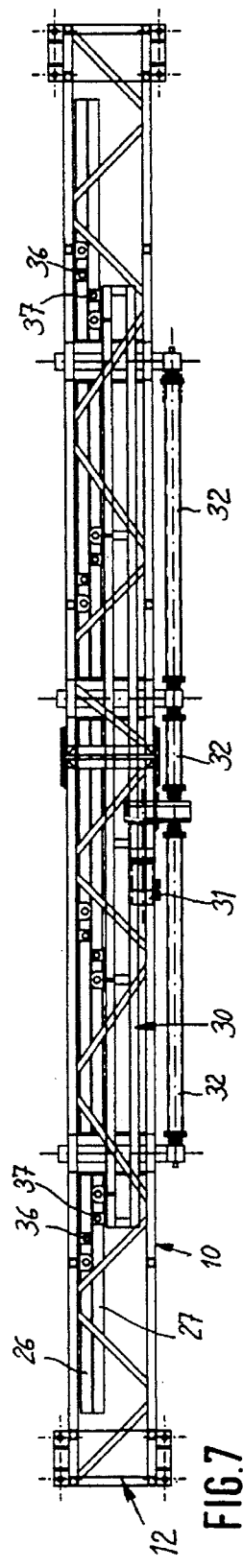
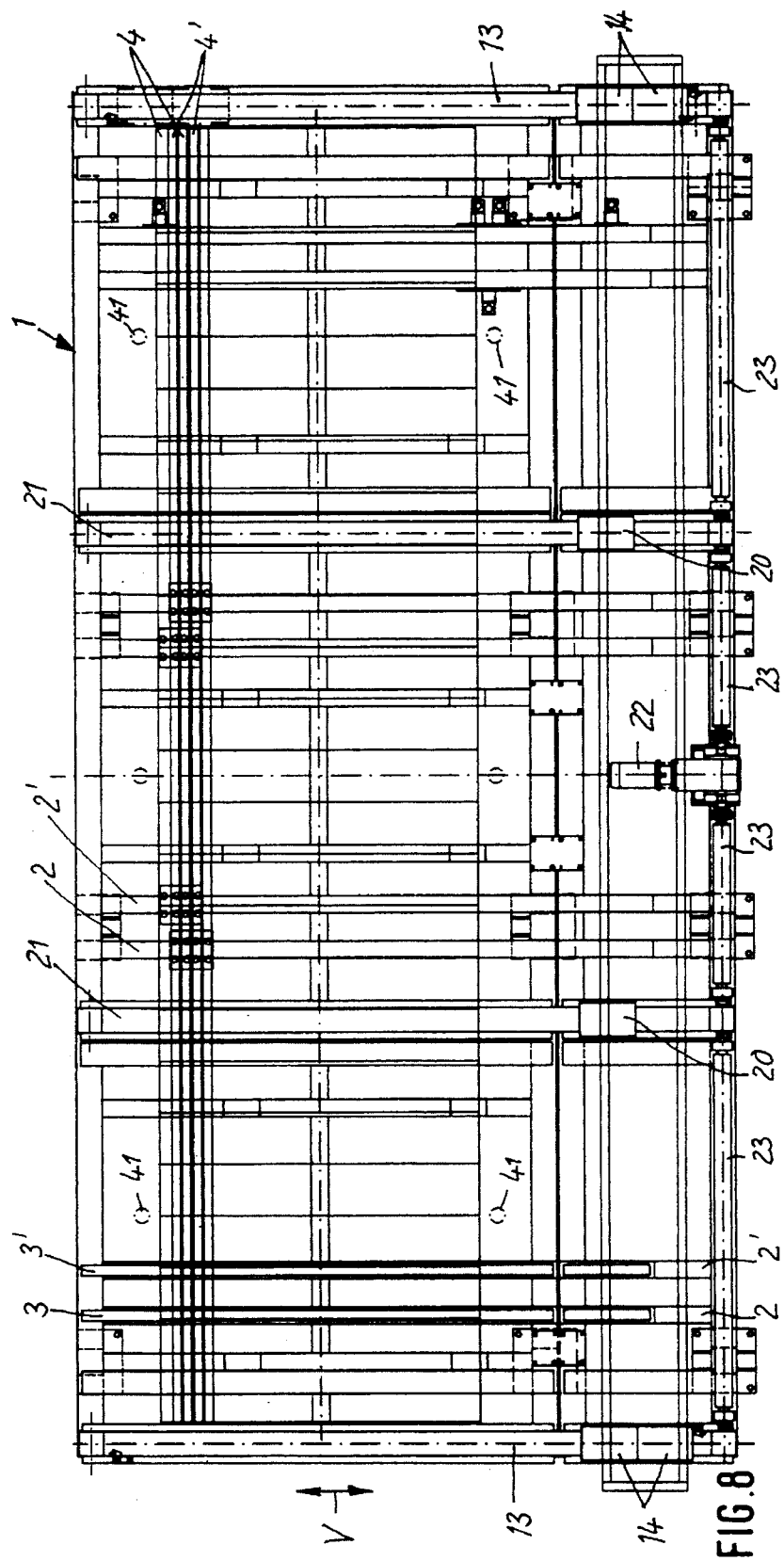
FIG.7
FIG.8

METHOD AND APPARATUS FOR ROW-WISE SEPARATION OF RECTILINEAR, PLASTIC POROUS CONCRETE BODIES

FILED OF THE INVENTION

This invention relates to a method and an apparatus for row-wise separation of rectilinear, plastic porous concrete bodies, which are formed by longitudinal and transverse curing of a rectilinear, plastic porous concrete block.

BACKGROUND OF THE INVENTION

A known apparatus (DE 2 502 866 C2), which is actually provided for curing a still plastic porous concrete block, can also be used to separate the cut porous concrete bodies. The known apparatus has a rectangular base frame with a plurality of horizontal laminae arranged parallel alongside each other and which are movable horizontally in the base frame transverse to their longitudinal direction, a plurality of support pedestals extending upwardly from the laminae and arranged in a row, spaced from one another, on the upper side of each lamina, and a drive device engaging at least at the ends of each lamina, by means of which the laminae can be moved and their mutual spacing be altered. In this known apparatus the laminae extend in the transverse direction of the frame and also in the transverse direction of the rectilinear porous concrete block. After the porous concrete block lying on its base surface has been cut in the transverse direction, so that cut gaps are present, the laminae are pushed together by the drive device, so that the cut gaps are closed up. This is done so that the edges shall not break out in the following longitudinal cutting of the porous concrete block when the cutting wires emerge at each cut gap. After the porous concrete block has also been cut in the longitudinal direction, the laminae are again separated in the longitudinal direction of the frame and also in the longitudinal direction of the porous concrete block, so that the porous concrete bodies are now again separated in the transverse direction of the block also and sticking together of the porous concrete bodies in the hardening is prevented. The separation is only used in this known apparatus when the block, as is only possible in this apparatus, is cut lying down and the cut series of porous concrete bodies are separated in the longitudinal direction of the porous concrete block. The separation is thus effected in a direction in which the porous concrete bodies have a width of 250 mm or a multiple thereof, so that they do not fall over in the separation in the longitudinal direction of the porous concrete block. In the transverse direction of the porous concrete block the porous concrete bodies have a spacing from one another which corresponds to the width of the cutting gap of about 0.8 to 1 mm. This space is indeed enough to prevent sticking together. If however the porous concrete bodies are also to be subjected to a drying operation during steam treatment in the autoclave, as is described in EP 0 133 239 B1 or DE 4 135 119 A1, this spacing is too small to be able to carry out the drying within reasonable time.

In the above-described apparatus, which is also provided for the longitudinal and transverse cutting of the porous concrete block, the porous concrete block is cut lying down, i.e. as it is cast. The length of the wires used for the transverse cutting must then be at least as large as the width of the porous concrete block, which usually amounts to about 1.5 m. Such long cutting wires can deflect to the side in the cutting, so that the accuracy of the cut porous concrete bodies suffers. For this reason it has already been proposed in DE-PS 958 639 to turn the porous concrete block through 90° on to its edge after casting and then to divide it up into porous concrete bodies by cutting wires which are parallel to the shortest edge and are guided vertically and horizontally. This does have the advantage that the cutting accuracy is increased but the cut porous concrete bodies lie on top of one another and can thus stick together in the steam hardening, because of their weight. It is therefore proposed in DE-PS 2 108 300 to turn the cut porous concrete block standing on edge back again through 90° on to its large, wide side (base surface) before it is put in the autoclave. Since however in the longitudinal cutting of the block standing on edge the weight thereof closes up the horizontal cut gaps resulting in the longitudinal cutting and the cut porous concrete slabs are pressed tightly together by the weight, there is also the danger that the porous concrete bodies will stick together even after the turning back again. Moreover the porous concrete bodies lie closely against one another in the transverse direction of the porous concrete block even after the turning back again, so that no hardening steam can get to their facing bounding surfaces. This prolongs the hardening operation and it is also not possible to subject the porous concrete bodies to a drying operation within a reasonable time during the treatment in the autoclave, as is described in EP 0 133 239 B1 or DE 4 135 119 A1.

SUMMARY OF THE INVENTION

The invention is therefore based on the object of providing a method and an apparatus for row-wise separation of rectilinear, plastic porous concrete bodies which are formed by longitudinal and transverse cutting of a rectilinear, plastic porous concrete block, of the kind initially referred to, with which the porous concrete bodies which can have any arbitrary thickness can be separated in the transverse direction of the porous concrete block without problem and without danger of tipping over in the transverse direction of the porous concrete block.

In the method for row-wise separation of rectilinear, plastic porous concrete bodies, which are formed by longitudinal and transverse cutting of a rectilinear, plastic porous concrete block, wherein the cut block is so supported for the separation on a plurality of mutually parallel laminae that each row of porous concrete bodies is supported on at least on lamina, and the porous concrete bodies are then separated row-wise by sequential separation of the laminae, the novelty resides in that the porous concrete block is so supported on the laminae on its largest side face (base surface) that its longest side edge runs parallel to the direction of the laminae, in that a clamping force is exerted before the separation from above on the upper ends of all the porous concrete bodies of the row to be separated and independently thereof from above on the upper ends of all the porous concrete bodies of the stationary row in contact with the row to be separated, and in that the clamping force is maintained during the separation and during the displacement of the lamina in the separating direction, a like directed displacing force is exerted synchronously on the upper ends of the porous concrete bodies carried by the separating lamina.

The apparatus for row-wise separation of rectilinear, plastic porous concrete bodies is characterized according to the invention in that the laminae are arranged in the longitudinal direction of the base frame parallel to the longest side of the porous concrete block, in that a longitudinal support is provided a distance above the base frame, extending horizontally and parallel to the laminae and can be moved in the direction of movement of the laminae, in that two horizontal clamp bars are arranged for vertical movement on the longitudinal support, being parallel to one another and to the longitudinal support, which bars can be pressed from above on to the upper ends of the porous concrete bodies of the two adjacent rows respectively which are to be separated from one another, in that one of the two clamp bars is movable on the longitudinal support in its direction of movement by a second drive means, and in that first drive means for the laminae and the second drive means for the clamp bar are synchronized with one another so that, in the separation of a lamina relative to the adjacent stationary lamina, the clamp bar located vertically above the separating lamina is moved in synchronism therewith and the clamp bar located vertically above the stationary lamina remains fixed in position.

It is possible with the method or apparatus according to the invention to separate porous concrete bodies which are formed by cutting a block preferable standing on edge with no problems and without the danger of tipping over in the transverse direction of the porous concrete block. Even if the porous concrete bodies stick together after the porous concrete block is turned back on to its major side surface, the porous concrete bodies cannot fall over in the separation, because separating forces are exerted simultaneously on their upper and lower ends in the separation. Since the invention proceeds from the concept of separating the porous concrete bodies in the transverse direction of the cut porous concrete block, it is also possible so to separate porous concrete bodies with the apparatus according to the invention which can have any thickness from a minimum thickness of about 50 mm in the transverse direction of the block. In order to support porous concrete bodies of different thicknesses, one or more laminae are used, pushed together in groups, depending on the thickness. Since the transverse beams of the hardening grid with which the porous concrete block is transported to the separating apparatus and taken away therefrom run in the direction of displacement of the laminae, the laminae can be moved arbitrarily to match different thicknesses of porous concrete bodies, without this movement being affected by the transverse beams. Because of the fact that the porous concrete block can preferably be cut standing on edge before the separation, this can be effected with relatively short cutting wires, which are only a little longer that the shortest side edge of the porous concrete block, whereby the porous concrete bodies have high accuracy.

Advantageous arrangements are characterized in the dependent claims.

BRIEF DESCRIPTION OF THE DRAWINGS

The invention is explained in more detail with reference to an embodiment shown in the drawings, in which:

FIG. 3 is enlarged scale side view, partially in section, of the apparatus

FIG. 4 is a partial front view of a lamina and of its guide,

FIG. 5 is a section on the line V—V of FIG. 4,

FIG. 7 is a top plan view of the gantry of the apparatus,

FIG. 8 is a plan view of the base frame with some laminae.

DETAILED DESCRIPTION

Figure 2:
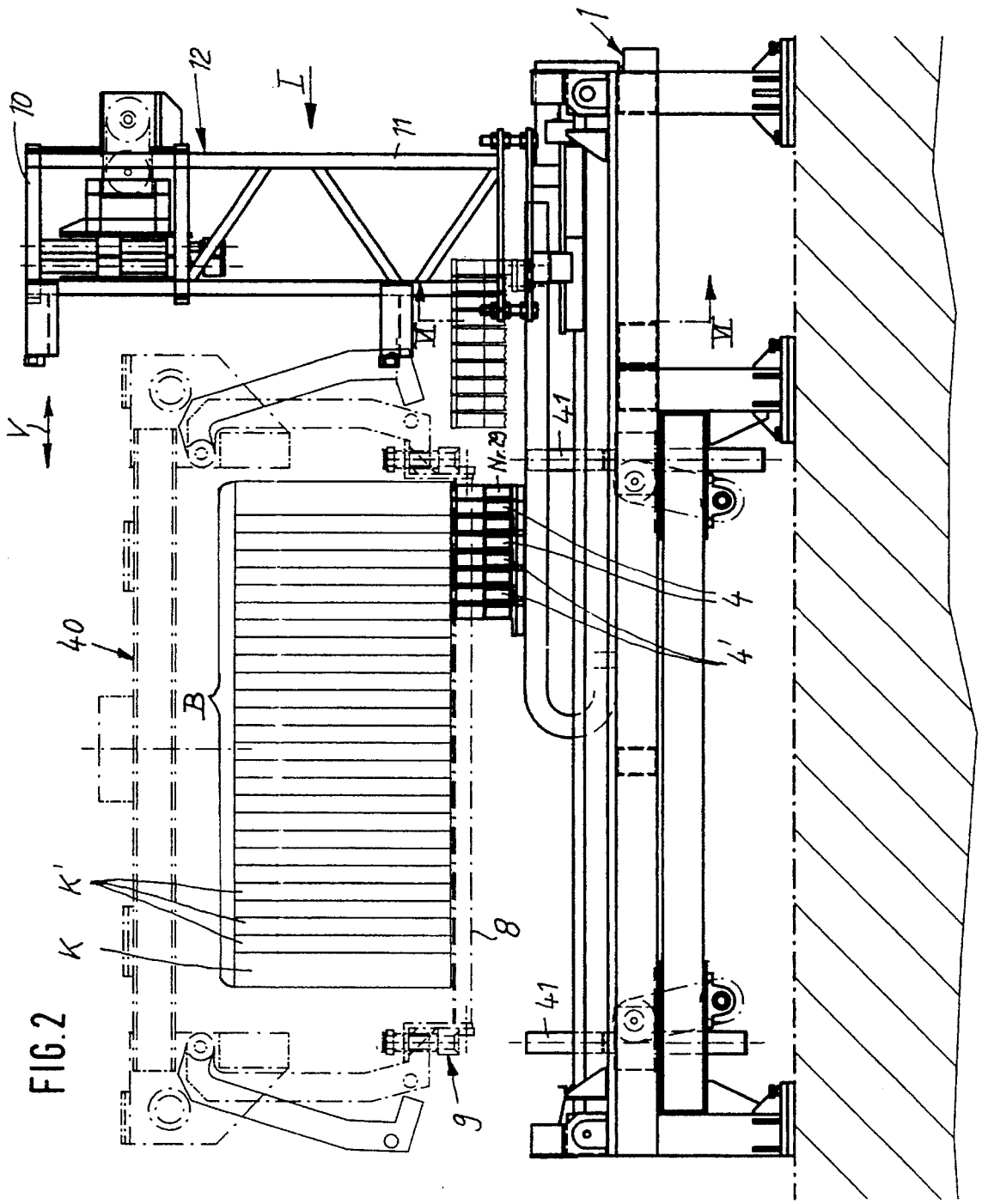
FIG. 2 is a side view of the same in the direction II of FIG. 1.

The base frame 1 which is substantially rectangular in plan view has a plurality of cross supports 2, 2', each with a guide rail 3, 3'. Details of such guide rails 3 are shown in FIG. 4. The guide rails 3, 3' serve for movable support of a plurality of laminae 4, 4', which extend in the longitudinal direction of the base frame 1. A still plastic, rectilinear, already cut porous concrete block B can be so placed on these laminae 4 such that its longest side, which can be 6 to 7.5 m long, extends in the longitudinal direction of the laminae 4. Each lamina therefore has a length which corresponds to the length of 6 or 7.5 m of the porous concrete block. The width of the porous concrete block can be 1.5 m for example and its height 625 mm. In order that the laminae 4, 4', as is shown in FIGS. 2, 3 and 5, can be moved close together, the rails 3 are associated with the laminae 4. The guide rails 3' are associated with the laminae 4' lying in between two laminae 4. In the region of a running rail 3 each lamina 4 has a small carriage 5, which is mounted on the corresponding running rail 3 by, in total, four rollers 6. Since the carriage 5 has a greater width in the direction of the running rail 3 than the lamina 4, the adjacent lamina 4' if mounted upon the same running rail 3 could not be pushed up tight enough against the lamina 4. Accordingly the separate guide rails 3' are provided for each second lamina 4', on which the laminae 4' are mounted by means of carriages and rollers, which correspond to the carriages 5 and rollers 6 described above.

Each lamina 4, 4' is provided on its upper side with a plurality of upwardly projecting pedestals 7, 7', arranged in each case in a row at distances from one another. These spaces are necessary in order for the transverse beams 8 of a hardening grid 9, shown in broken lines, which serve to transport the porous concrete block B or the porous concrete bodies, to have space between the support pedestals 7 or 7' of a lamina 4, 4'.

Above the base frame 1, at a distance H which is greater than the maximum height of the porous concrete bodies K there is arranged a horizontal longitudinal support 10, which is a movement support means and which runs parallel to the laminae 4, 4'. This longitudinal support 10 advantageously forms a gantry 12 with standard means, which are standards 11, at the ends of the longitudinal support 10, the gantry being movable in the direction of displacement V of the laminae 4, 4'. To this end, running rails 13 are arranged at the two cross sides of the base frame 1. The two standards 11 are mounted for horizontal movement on these running rails 13 by means of carriage means which are carriages 14.

Figure 6:
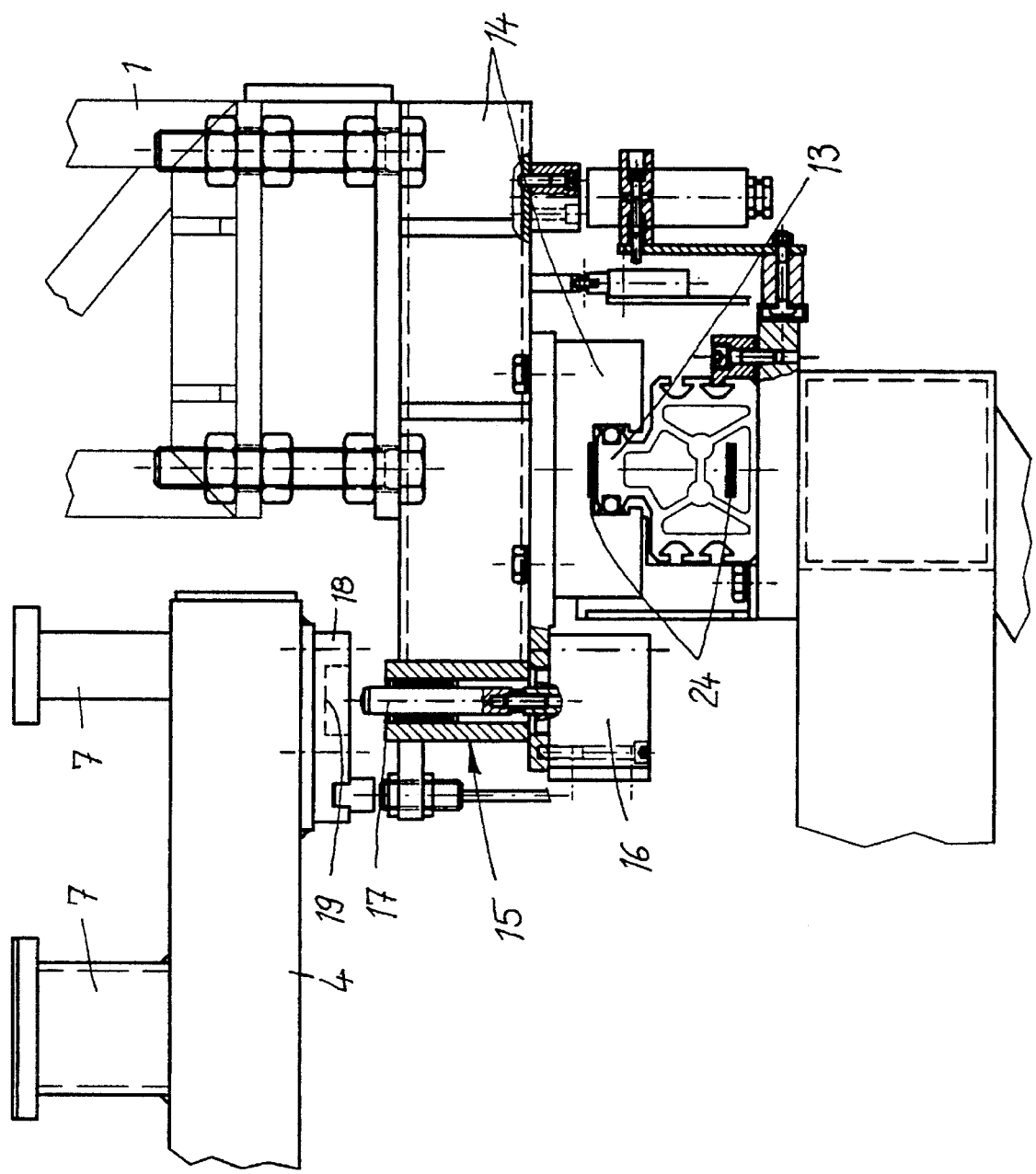
FIG. 6 is a partial section on the line VI—VI in FIG. 2 at the end of a lamina.

According to FIG. 6, a first drive means, which includes a coupling device 15, is provided on the carriage 14 and has a coupling bolt 17 which is vertically movable by means of a compressed air cylinder 16. Each lamina 4, 4' is provided at one of its ends with a coupling piece 18, which has a downwardly open recess 19. This recess 19 can be formed as a slot running in the longitudinal direction of the lamina but has a dimension in the direction V of displacement of the laminae which corresponds to the diameter of the coupling bolt 17. Since the smallest thickness of the porous concrete bodies K to be separated from one another amounts to 50 mm, the width b of each individual lamina 4, 4' must be less than 50 mm. If the coupling devices 15 for the horizontal displacement of the laminae 4, 4' only engaged the ends thereof, then the laminae which are more than 6 m long and relatively thin would also bow in the horizontal direction. In order that this shall not occur there are two further coupling devices 15 between the ends of the laminae 4, 4', corresponding to the above described coupling devices 15. Each of these further coupling devices 15 is arranged on a slide 20 which is itself movably mounted on a guide rail 21. The two guide rails 21 extend parallel to the running rails 13. The slides can be driven synchronously with the carriages 14 of the gantry 12. This can advantageously be effected by a common drive motor 22 arranged on the base frame 1, which drives endless toothed belts 24 (see FIG. 6), which are connected to the respective carriage 14 or slide 20 and run parallel to the respective running rails 13 and guide rails 21, through drive shafts 23 arranged parallel to the laminae 4, 4'. Instead of endless toothed belts, endless chains or a spindle drive could also be used.

Important components of the apparatus are two mutually parallel clamp bars 26, 27 which run horizontally and parallel to the laminae 4, 4' and are movable vertically in the direction C. These clamp bars 26, 27 are mounted on the longitudinal support 10. Each of the clamp bars 26, 27 can be constructed in one piece over the length of the longitudinal support 10 or consists of several sections. The clamp bar 26 is connected to a plurality of vertical guide rods 28 which are mounted for vertical sliding directly in the longitudinal support 10, for example through suitable guide bushings 29. A second drive means including support beam 30 is mounted in the longitudinal support 10 so as to be movable horizontally in the direction of movement of the gantry 12, i.e. also in the direction V of displacement of the laminae. A drive motor 31 is provided for moving the support beam 30 in the longitudinal support 10 and drives three slides 33 through horizontal drive shafts 32 and endless toothed belts, not shown. The support beam 30 is mounted for movement by the slides in the longitudinal support 10 in the direction D. The drive motor 31 of the support beam 30 is also coupled to the drive motor 22 of the carriages 14 and the slides 20 so that the movement of the gantry in the direction V and the movement of the support beam 30 in the direction D are synchronised with one another but, but move opposite directions. The movements of the gantry 12 and the support beam 30 thus take place at the same time and through equal displacements, but in opposite directions.

The vertical guide rods 35 are connected to the second clamp bar 27 and are mounted for vertical movement on the support beam 30. A plurality of pneumatic cylinders 36, 37 serve to drive the clamp bars 26, 27 respectively.

The manner of operation of the novel apparatus is as follows:

An approximately rectilinear porous concrete block is first cast in a rectangular casting mould, not shown, the horizontal mould bottom forming the largest surface (base surface) of the porous concrete block. After the porous concrete mass has attained the so-called green strength, the sidewalls of the mould are removed and the block is taken to a cutting machine. In this cutting machine the block is first turned through 90° so that it stands on its longer narrow side and the previously horizontal base surface is arranged vertical. In this position the porous concrete block is firstly cut by horizontally tensioned wires, which are pulled horizontally through the block in the longitudinal direction, and then in the transverse direction by horizontal wires which are moved from below upwardly. Depending on the spacing and number of these cutting wires, there thus result rectilinear porous concrete bodies of greater or smaller size, which are called porous concrete bricks, blocks or slabs, depending on their format. Since the weight of the porous concrete mass above the current cutting gap presses down when cutting in a horizontal direction, the cut gap closes up again after the cutting wire passes. In contrast, the cutting gaps which result in the transverse cutting remain and their width corresponds substantially to the diameter of the cutting wires, which can lie between 0.3 and 0.9 mm. The porous concrete block thus cut in the longitudinal and transverse directions is turned back again through 90°, so that it comes to lie with it base surface, which was vertical during cutting, positioned horizontally again on a hardening grid 9. The hardening grid with the cut block lying thereon can be transported by means of a crane to the apparatus according to the invention.

Since the apparatus for separating porous concrete bodies is intended for entirely different thicknesses of separate concrete bodies measuring between 50 mm and 375 mm, the apparatus must first be matched to the cut thickness of the porous concrete bodies. It is assumed that the 1450 mm wide porous concrete block has been cut into rectilinear porous concrete bodies by cutting in the longitudinal direction, where the two outermost porous concrete bodies K have a thickness d of 100 mm while the intervening porous concrete bodies K' have thickness d' of 50 mm each. In the longitudinal direction of the porous concrete block B, the porous concrete bodies K can be cut on the grid with a width of 250 mm each, where the width B1 in the longitudinal direction can also correspond to a multiple of the grid measurement of 250 mm. The height of the porous concrete bodies K, K' amounts uniformly to 625 mm. When the finished porous concrete bodies are later marketed, sold and used, it is possible that the designations of the various dimensions of the porous concrete bodies will be interchanged, because the longest dimension is usually called the length.

The width b of the support faces 7a of the support pedestals 7, 7' corresponds in the direction V of movement of the laminae 4, 4' to about the smallest thickness d' of 50 mm of the porous concrete bodies. Actually the width b is less than 50 mm, because account has to be taken of the fact that porous concrete residues and other impurities stick on the facing vertical surfaces of the support pedestals, so that the laminae can no longer be pushed together tightly enough. For this reason the coupling pieces 18 are so formed that they also serve at the same time as spacers and, when the laminae 4, 4' are pushed together, so support these relative to one another that the laminae are arranged with an accurate pitch of 50 mm relative to one another. For the sake of simplicity however, it is assumed in the following that the width b of the support faces 7a corresponds to the pitch of 50 min. In order to receive a cut porous concrete block B with a total width of 1450 mm 29 laminae are thus required. The total pack of laminae 4, 4' is normally "parked" at one long side of the frame 1. The movements of the gantry 12 are controlled by a suitable automatic programmed control. When 29 laminae are required, the gantry is moved to the 29th lamina and this is then coupled to the carriage 14 and the slides 20 by the four coupling devices 15 on the carriages 15 and the slides 20, in that the coupling bolts 17 are pushed up into the recesses 19 by means of the pneumatic cylinders 16. The carriages 14 and slides 20 and the lamina No. 29 coupled thereto are pushed away from the rest of the parked laminae by the drive motor 22, until sufficient space is made for the lifting device 40 shown in broken lines in FIG. 2 and the hardening grid 9.

Figure 1:
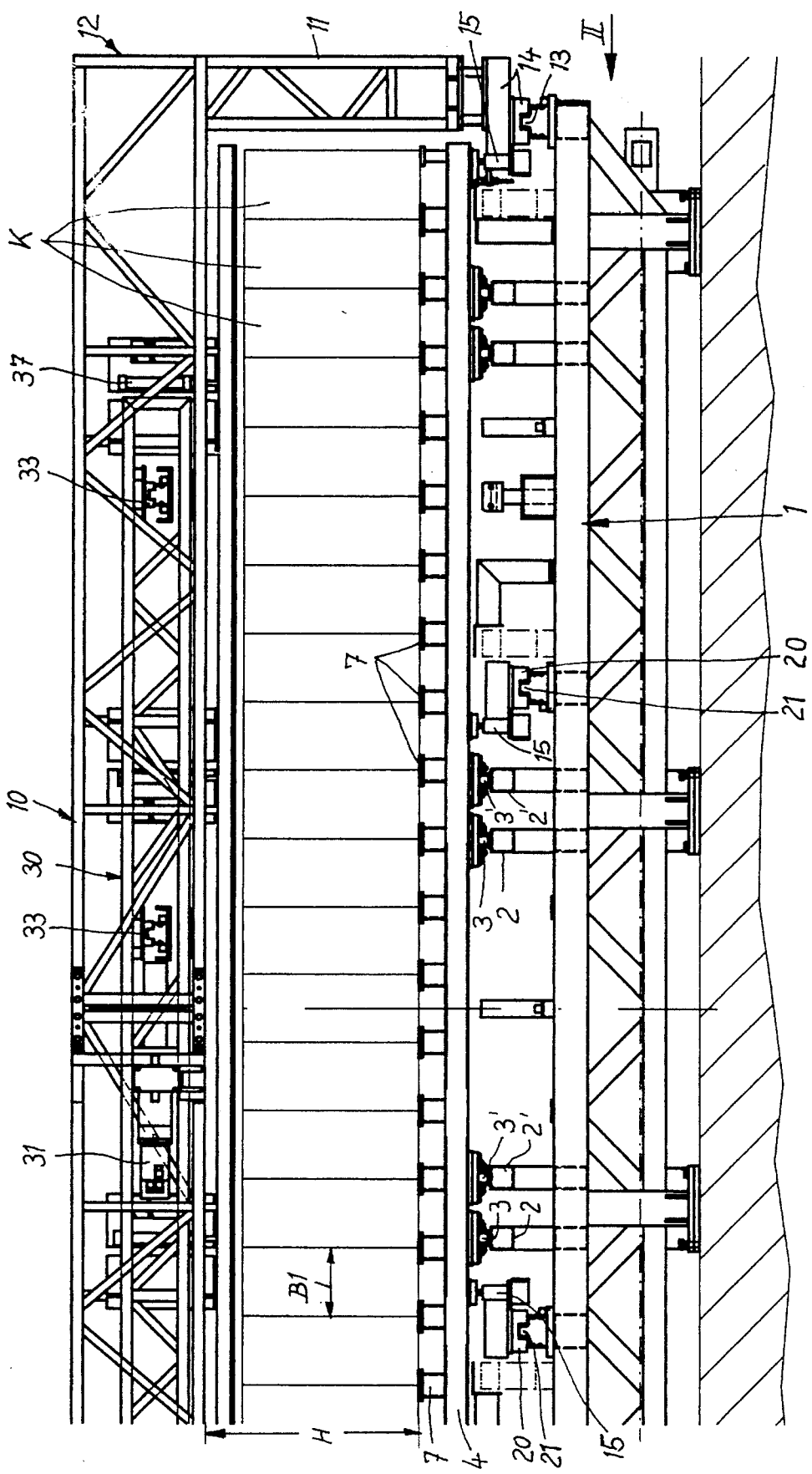
FIG. 1 is a front view of the apparatus in the direction I of FIG. 2.

The coupling devices 15 are then uncoupled and the gantry 12 is moved back in correspondence with FIG. 2 to its right, starting position. The hardening grid 9 with the cut porous concrete block thereon can be set down on the laminae 4, 4' by means of the lifting device 40. The porous concrete bodies K, K' come into abutment with the support pedestals 7, 7', the outer, 100 mm thick porous concrete bodies K each resting on two adjacent support pedestals 7, 7', while each only 50 mm thick porous concrete body K' is supported on the halves of two adjacent support pedestals 7 of a lamina 4 or two adjacent support pedestals 7' of a lamina 4', as is apparent from FIGS. 1 and 4. The hardening grid 9 is lowered until the surfaces of its transverse beams 8 lie below the support faces 7a but the transverse beams 8 do not bear on the laminae 4, 4'. The plungers 41 serve to support the hardening grid 9 in this position, being moved up into a suitable position.

The separation can now begin. The gantry 12 is moved for this purpose in the direction V so far to the left (as illustrated in FIG. 2) that the coupling bolts 17 are located under the second lamina from the left. The lamina No. 2 is then coupled to the carriages 14 and the slides 20 by the coupling bolts 17. In this position of the gantry 12, the clamp bar 26 carded directly by the gantry is vertically above the lamina No. 2 and the clamp bar 27 carded by the support beam 30 is vertically over the lamina No. 3 (FIG. 3). By means of the pneumatic cylinders 36, 37 the clamp bars 26, 27 are moved down in the direction C until they bear with sufficient pressure on the upwardly directed ends of the porous concrete bodies K and K' respectively. All porous concrete bodies K, which lie next to each other in the transverse direction of the porous concrete block B, are thus clamped by the clamp bar 26 with the lamina No. 2 lying thereunder, while the porous concrete bodies K' of the neighbouring row bearing thereagainst are clamped by the clamp bar 27 and the lamina No. 3 lying thereunder. When the gantry 12 is now moved to the left, according to FIG. 3, the coupled lamina No. 2 is hereby displaced to the left and pushes the lamina No. 1, on whose support pedestals the first row of porous concrete bodies of the larger thickness d is likewise supported. Since the porous concrete bodies K' are clamped by the pressure of the clamp bar 27 and the clamp bar 26 also moves to the left with the longitudinal support 10 of the gantry 12, the clamp bar 26 is pushed synchronously to the left with the two laminae Nos. 1 and 2. The support beam 30 is however driven at the same speed but in the opposite direction by the drive motor 31, so that it moves relative to the gantry 12 to the right. Since however the speed of the support beam 30 is the same as the speed of travel of the gantry, the support beam 30 and thus the other clamp bar 27 stays fixed in position. The lamina No. 3 lying thereunder also remains fixed in position on account of frictional forces. The row of porous concrete bodies K' clamped between the clamp bar 27 and the lamina No. 3 is held positionally fixed. This ensures that none of the porous concrete bodies K and K' previously adhering to each other fall over during the separation. If the gap which results between two adjoining rows of porous concrete bodies after their separation should amount to 2 mm, the lamina No. 2 is moved to the left by the desired gap width times the number of gaps to be produced by separation, in this case 2 mm times 26 or even a little more.

After this has taken place the coupling devices 15 are uncoupled and the clamp bars 26, 27 are raised. The gantry 12 is driven back to the right until the coupling bolts 17 are located beneath the lamina No. 3. At the same time the support beam 30 is moved to the left relative to the longitudinal support 10 into its starting position. The clamp bar 26 is then located above the lamina No. 3 and the clamp bar 27 over the lamina No. 4. Lamina No. 3 is coupled to the gantry in the way described above and the two clamp bars 26 and 27 are pressed on to porous concrete bodies K' supported by the laminae Nos. 3 and 4 respectively. After the next two rows have been clamped in this way the separating operation is repeated. The path of travel of the gantry 12 is shortened by 2 mm this time relative to the path of travel previously covered, so that a gap of 2 mm now remains between the first separated row of porous concrete bodies K and the second row of porous concrete bodies K' located on the lamina No. 3. After all porous concrete bodies have been separated row-wise from one another in this way, the gantry 12 travels back to its fight starting position in accordance with FIG. 2 and the hardening grid 9 can now be raised again by means of the lift device 40, the porous concrete bodies now separated from one another thus being raised from the support pedestals 7, 7'. The hardening grid is then moved in known manner to an autoclave, where the porous concrete bodies remain on the hardening grid and are steam hardened.

Depending of the thickness of the porous concrete bodies, which can amount to between 50 and 375 mm, the support of a porous concrete block uses more or less laminae lying alongside each other. With the novel apparatus porous concrete bodies can also be separated whose thickness is not a whole multiple of 50 mm. Assuming that the thickness of the porous concrete bodies to be separated from one another amounts to 225 mm, a group of four laminae 4, 4' lying alongside each other is used to support such porous concrete bodies. If the laminae are brought by the gantry from the parked position into their working position at the beginning of each operation, this can be so effected that the required number of laminae 4, 4' are first pushed away from the parked laminae as a pack and that the laminae are brought in groups, similarly as in the separation, to a spacing such that between the groups of four laminae there is a space of 25 mm. After the groups of laminae have been positioned in this manner, the porous concrete block is set on the laminae and the separation is effected in the manner previously described, the last lamina of each group being coupled to the gantry each time before the separation.

The embodiments of the invention in which an exclusive property or privilege is claimed are defined as follows:

1. A method for row-wise separation of rectilinear, plastic porous concrete bodies which are formed by longitudinal and transverse cutting of a rectilinear, plastic porous concrete block, the porous concrete bodies each having an upper side, the method comprising the steps of supporting the porous concrete block during separation on a plurality of mutually parallel laminae such that each row of porous concrete bodies is supported on at least one lamina, and then separating the porous concrete bodies row-wise by sequential separation of the laminae in a separating direction, wherein the method step of supporting the porous concrete block includes the step of supporting the porous concrete block on the laminae on a largest side face, a longest side edge thereof extending parallel to the direction of the laminae, wherein a clamping force is applied, before the separation step, from above on the upper sides of all of the porous concrete bodies of the row to be separated and independently from above on the upper sides of all of the porous concrete bodies of a stationary row that is in contact with the row to be separated, wherein the clamping force is maintained during the separation step and during the displacement of the lamina in the separating direction, and wherein a displacing force is applied synchronously to the upper sides of the porous concrete bodies carried by the separating lamina.

2. The method according to claim 1, further comprising the step of turning the porous concrete block through 90° before being laid on the laminae, so that the porous concrete block lies on a major side surface thereof before the porous concrete block is supported on the laminae.

3. In an apparatus for row-wise separation of rows of rectilinear, plastic porous concrete bodies which are formed by longitudinal and transverse cutting of a rectilinear, plastic porous concrete block, each of the porous concrete bodies having an upper side, the apparatus having a substantially rectangular base frame, a plurality of horizontal laminae arranged parallel alongside each other having an upper side and two ends, and movement support means for supporting the laminae for horizontal movement in the base frame transverse to a longitudinal direction of the laminae, a plurality of support pedestals extending upwardly from the laminae and arranged in a row, spaced from one another, on the upper side of each lamina, and a first drive means selectively attachable at least at the ends of each lamina for movably driving the laminae to selectively move the laminae to alter the mutual spacing therebetween, wherein the laminae are arranged in a longitudinal direction of the base frame parallel to a longest side of the porous concrete block, wherein a longitudinal support is provided a distance above the base frame, extending horizontally and parallel to the laminae and is supported for movement in a direction of movement of the laminae, wherein two horizontal clamp bars are vertically moveable on the longitudinal support, are parallel to one another and to the longitudinal support and press from above on the upper sides of the porous concrete bodies of two adjacent rows of rectilinear, plastic porous concrete bodies respectively which are to be separated from one another, one row being supported on a separating lamina and the other row being supported on a stationary lamina, wherein a second drive means for movably driving one of the two clamp bars is provided to move said one of the two clamp bars on the longitudinal support in the direction of movement, and wherein the first drive means for the laminae and the second drive means for the clamp bar are synchronized with one another such that, in the separation of the separating lamina of said plurality of horizontal laminae relative to the adjacent, stationary lamina, the clamp bar located vertically above the separating lamina is moved in synchronism and the clamp bar located vertically above the stationary lamina remains fixed in position.

4. The apparatus according to claim 3, wherein the longitudinal support is part of a gantry, the gantry being movable in the direction of movement of the laminae.

5. The apparatus according to claim 4, wherein the gantry is supported on running rails attached on two opposite sides of the base frame.

6. The apparatus according to claim 4, wherein the first drive means includes a standard means for upholding the gantry, wherein a carriage means is provided for movably joining the standard means to the base frame, and a coupling device is operatively attached on the carriage means of the standard means of the gantry, so that the lamina currently to be separated can be coupled to the carriage means.

7. The apparatus according to claim 6, wherein the coupling device comprises a coupling bolt inserted into a recess in the lamina to effect coupling.

8. The apparatus according to claim 5, wherein the first drive means includes a standard means for upholding the gantry, wherein a carriage means is provided for movably joining the standard means to the base frame, wherein guide rails are provided in between and parallel to the running rails of the gantry, on each running rail is mounted a slide driven in synchronism with the carriage means of the gantry, and wherein a coupling device is operatively attached on each slide so that the lamina currently to be separated is coupled to the slide.

9. The apparatus according to claim 8, wherein the first drive means further includes a common drive motor for synchronously driving the carriage means and slides, the common drive motor driving endless toothed belts positioned parallel to respective running rails and guide rail via drive shafts arranged parallel to the laminae, the belts being coupled to at least one of the carriage means and the slide.

10. The apparatus according to claim 4, wherein a first drive motor of the gantry and a second drive motor of the second drive means for the clamp bar are synchronized by an electric shaft so that the movement of the gantry and the second drive means are opposite to one another.

11. The apparatus according to claim 8, wherein the first drive means further includes a common drive motor which synchronously drives both the carriage means and the slides with chains parallel to the respective running rails and the guide rail via drive shafts arranged parallel to the laminae, the chains being coupled to at least one of the carriage means and the slide.

* * * * *

UNITED STATES PATENT AND TRADEMARK OFFICE
CERTIFICATE OF CORRECTION

PATENT NO. : 5 584 374
DATED : December 17, 1996
INVENTOR(S) : Wilfried Hartmann et al It is certified that error appears in the above-indentified patent and that said Letters Patent is hereby corrected as shown below:

On the title page, Section [73];
   change "Assignee: Heber Aktiengesellschaft,
                           Emmering, Germany" to
   ---Assignee: Hebel Aktiengesellschaft,
                           Emmering, Germany---.

Signed and Sealed this

Third Day of June, 1997

Attest:

BRUCE LEHMAN

Attesting Officer         Commissioner of Patents and Trademarks